Figure 1:
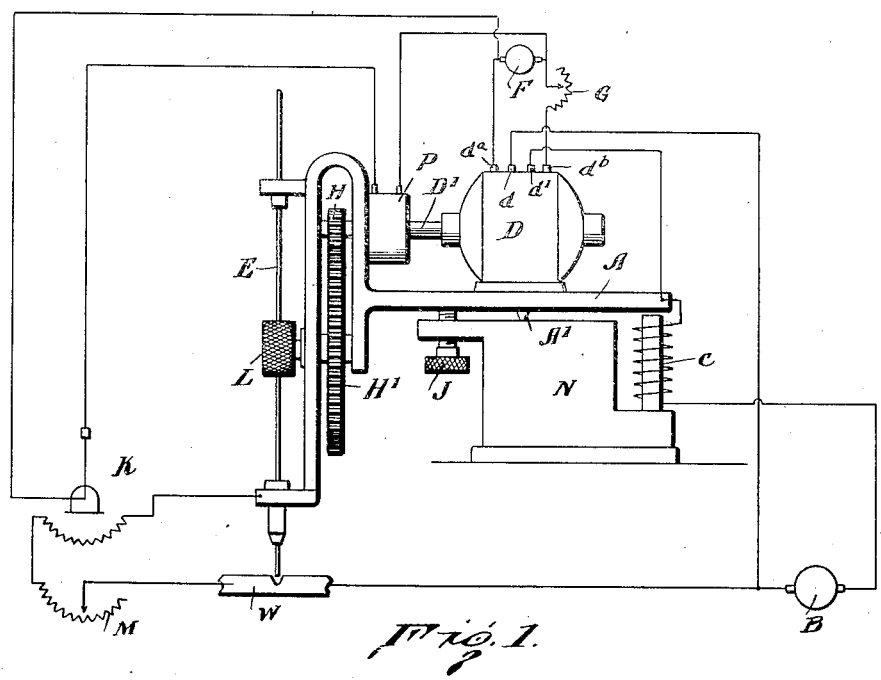

Feb. 2, 1926.

O. A. KENYON

AUTOMATIC WELDER

Original Filed Dec. 13, 1920

Inventor
Otis A. Kenyon
By J. Walter Fowler Jr.
Attorney

Patented Feb. 2, 1926.

1,571,924

UNITED STATES PATENT OFFICE.

OTIS ALLEN KENYON, OF NEW YORK, N. Y., ASSIGNOR TO WESTINGHOUSE ELECTRIC & MANUFACTURING COMPANY, A CORPORATION OF PENNSYLVANIA.

AUTOMATIC WELDER.

Application filed December 13, 1920, Serial No. 430,407. Renewed January 7, 1926.

*To all whom it may concern:*

Be it known that I, OTIS A. KENYON, a citizen of the United States, residing at New York city, in the county of New York and State of New York, have invented certain new and useful Improvements in Automatic Welders, of which the following is a specification.

The present invention relates to automatic arc welders, and the purpose of the invention is to overcome all the troubles that result from the use of a low-resistance armature and to permit the use of a motor that has the best possible speed—E. M. F. characteristics. It is further the object of this invention to provide improved means of starting the arc, for re-establishing the arc in case of accidental breakage, and for preventing the electrode from sticking to the work.

Welding with motor-driven electrodes involves a number of difficulties that seriously interfere with the operation of the arc when it is attempted to vary the welding conditions over a wide range.

In order to weld automatically, an electrode feeding device must meet the following conditions: It must feed the electrode at such a rate as to maintain the arc irrespective of variations in the melting rate of the electrode; it must provide means for automatically drawing the arc at the start; it must provide means for automatically re-establishing the arc in case of accidental breaking; it must not stop in case the electrode accidentally touches the work.

There are various methods of feeding the electrode, but the present invention is limited to machines in which the electrode is driven by an electric motor, the armature of which is connected across the terminals of the arc as set forth in my application No. 209,343 filed Dec. 28, 1917.

There are two general methods of starting the arc in the motor-driven machine, namely: By separate means independent of the feeding means as set forth in my application No. 323,538, filed Sept. 13, 1919; by reversing the motor to withdraw the electrode. For re-establishing the arc there is only one means now in use, namely: Allow the motor to feed the electrode forward until it makes contact with the work.

For limiting the minimum length of arc and thus preventing an accidental contact of the electrode with the work from stopping the welding operation, there is also only one means now in use, namely: Raising the electrode by means of an electro-magnet controlled by a relay connected across the arc as set forth in my application, Ser. No. 323,538, filed Sept. 13, 1919.

In order to get satisfactory speed control under widely varying welding conditions, it is necessary to use an armature circuit of comparatively low resistance and of constant resistance. Resistance in this circuit magnifies the sensitiveness of the motor to changes in the arc E. M. F. and tends to produce over-travel. Resistance in the armature circuit also has the disadvantage of varying the speed with each variation in the friction of the mechanism.

On the other hand low resistance in the armature circuit affects the stability of the arc by placing a low-resistance shunt across the arc each time the motor stops, which occurs whenever the electrode either touches the work or reverses.

The principles involved in the construction of my improved welding machine are as follows: The normal feeding of the electrode into the arc is accomplished by means of an electric motor, the armature of which is connected solidly across the terminals of the arc so as to give a shunt of constant resistance. Rheostats and switches, or contactors, in this circuit introduce moving contacts of uncertain resistance and should therefore be eliminated. The motor is so designed that its speed can be varied over a wide range by variation of its field current. The arc is first established by allowing the motor to feed the electrode down until it contacts with the work and then instantly withdrawing it a predetermined distance by the action of an electromagnet acting against the weight of the machine. In case of accidental breakage the electromagnet which is connected in series with the arc, releases the feeding mechanism and allows it to fall under its own weight into contact with the work. The distance it falls need not necessarily be enough to make contact with the work, as the motor is running all through the operation and will soon make up for any discrepancy between the travel of the magnet and the gap at the time the arc broke. The minimum length of arc is limited by inserting a magnetic clutch between the motor and the feeding mechanism and slipping the clutch each time the arc E. M. F. drops to a definite and predetermined value. This action prevents the electrode from accidental contact of sufficient duration to cause it to cool or freeze to the work and thus interrupt the welding operation.

Figure 2:
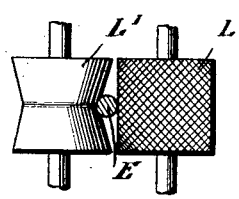
Figure 3:
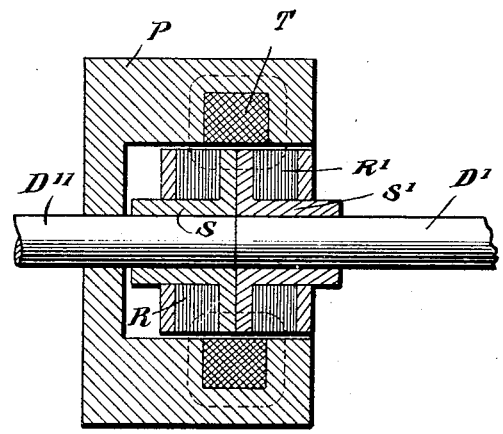

One embodiment of these principles is shown in Fig. 1, which is a general assembly of the welding machine showing the electrical connections. Figure 2 is a detail of the feeding rolls, and Figure 3 is a cross section of the magnetic clutch.

Referring to Fig. 1, the line goes as follows: Beginning with the welding generator B the line goes to the starting electro-magnet C, from whence it goes to the frame A of the machine, thence through the electrode E, across the arc to the work W, and then back to the generator B. The motor D which drives the mechanism has its armature terminals $d$, $d'$ connected across the terminals of the arc, and its field terminals $d^a$ and $d^b$ connected across a constant-potential source F and in series with a rheostat G which is used to adjust the speed of the motor. The motor D drives the gears H, H', and the latter drives the knurled feeding roll, L, and the pressure roll L', as will be seen from an inspection of Fig. 2. The frame A is mounted on a fulcrum point A', and this fulcrumed frame is adjusted by means of the screw J to vary the amplitude of its swing. K indicates a contactor which is connected across the arc and in series with a rheostat M, which latter is used to adjust the operating voltage of the contactor. The main contacts of the contactor K are connected in series with the magnetic clutch P, which is connected across the terminals of the constant-potential source F.

The operation of this particular machine is as follows: The motor D drives the feeding roll L, and normally feeds the electrode towards the work.

When the E. M. F. across the arc falls below a certain adjustable amount the contactor K opens and cuts out the operating coil of the magnetic clutch P, allowing the motor to run free. Then when the arc melts off the end of the electrode, lengthening the arc and increasing its E. M. F., the contactor closes again and causes the clutch P to grip and resume the feeding of the electrode. All this is accomplished without stopping or reversing the motor. Even if the arc is short-circuited and the E. M. F. goes to zero, it will not stop because there will be enough drop in the arc circuit to run the motor with no load. If necessary it could be arranged to open the field circuit of the motor each time the clutch slipped so as to allow the motor to spin by its own momentum, but in the practical work this has not yet been found necessary.

The whole feeding mechanism including the motor is mounted on a sub-base A, and fulcrumed on the rib A' about which it can rock under the alternate influence of its own weight and the pull of the electro-magnet C, which is attached to the pedestal N. The amplitude of the swing can be adjusted by the screw, J, which determines the length of the initial arc.

As soon as E. M. F. is applied to the terminals of the arc, the motor starts and drives the electrode toward the work. The mechanism is normally tipped toward the work as far as the screw J will allow it to go. The instant the electrode touches the work, W, electric current is drawn through the electromagnet C, which tips the mechanism back and draws the arc before the motor D has time to stop. The arc E. M. F. now controls the speed of the motor in such a way as to keep the arc E. M. F., and therewith the arc length, constant. While running, the arc length can be changed at will by changing the motor field current with field rheostat G.

If for any reason, such as a current of air or a disturbance in the electric circuit, the arc is extinguished, magnet C will instantly release and allow the electrode to drop onto the work. The moment the electrode makes contact with the work the magnet will be energized and will instantly withdraw the electrode, again establishing the arc. Such a disturbance will affect the speed of the motor, but it will neither stop nor reverse it, but by means of the contactor, K, and the clutch P it will be disconnected from the feeding mechanism as long as the arc E. M. F. is below the value required to close contactor K and keep it closed.

This method of starting and reestablishing the arc has many advantages, among which may be mentioned the following: The feeding motor is entirely relieved of the starting duty. Any value of pull-up power may be used without in any way affecting the power of the motor. The possibility of over-travel in the reverse direction is positively eliminated. Lost motion in the feeding mechanism in no way affects the starting of the arc. A lost arc can be picked up instantly in the same crater without stopping the travel of the work and before the deposited metal has time to cool.

As the arc travels along the work it cuts a trench due to the formation of a crater and if it is moving fast and the electrode is being fed rapidly, the arc may jump about in such a way as to bring the electrode into actual contact with comparatively cold metal extinguishing the arc and often causing the electrode to freeze to the work. To prevent interruption of the welding operation I provide the magnetic clutch P, which slips, allowing the feeding mechanism to stop the instant the arc length or E. M. F. reaches a predetermined minimum value. In this way an actual contact with the cold metal is anticipated and the electrode allowed to stand still until the arc has consumed enough to re-establish a normal length of arc. This method of limiting the minimum length of arc is an improvement over my former invention covered by application No. 323,538 filed Sept. 13, 1919, in that it does not introduce a sudden change in the arc E. M. F. and thus cause an equally sudden burst of speed on the part of the motor.

The magnetic clutch used for the purpose of connecting the motor to the feeding mechanism may be any suitable construction. In the present case a construction such as shown in Fig. 3 is preferred. The clutch proper consists of a laminated core divided into two parts R—R', one attached to each shaft D' and D'' by means of the sleeves S and S'. The exciting coil T is mounted in the stationary housing P. Magnetism produced by the exciting coil T passes through the core and the housing as shown by the lines, and attracts the two parts of the core tightly together. When there is no current in the exciting coil the load on the driven side is sufficient to slip the clutch and allow the motor to run free while the feeding mechanism stands still.

Having thus described my invention what I claim as new and desire to secure by Letters Patent is:—

In an automatic arc welding machine utilizing an arc between a consumable electrode and the work, the combination of electrode feeding mechanism including a rotating electric motor electrically energized in such manner as to automatically accelerate when the arc is too long and decelerate when the arc is too short, and electro-responsive clutch mechanism for disengaging said motor from the electrode and permitting the latter to remain stationary during the time when an unusually short arc-length is momentarily obtained during the operation of the machine.

In testimony whereof I hereunto affix my signature.

OTIS ALLEN KENYON.